Feb. 14, 1939.  L. C. DOANE  2,147,284
HICKEY
Filed May 1, 1937
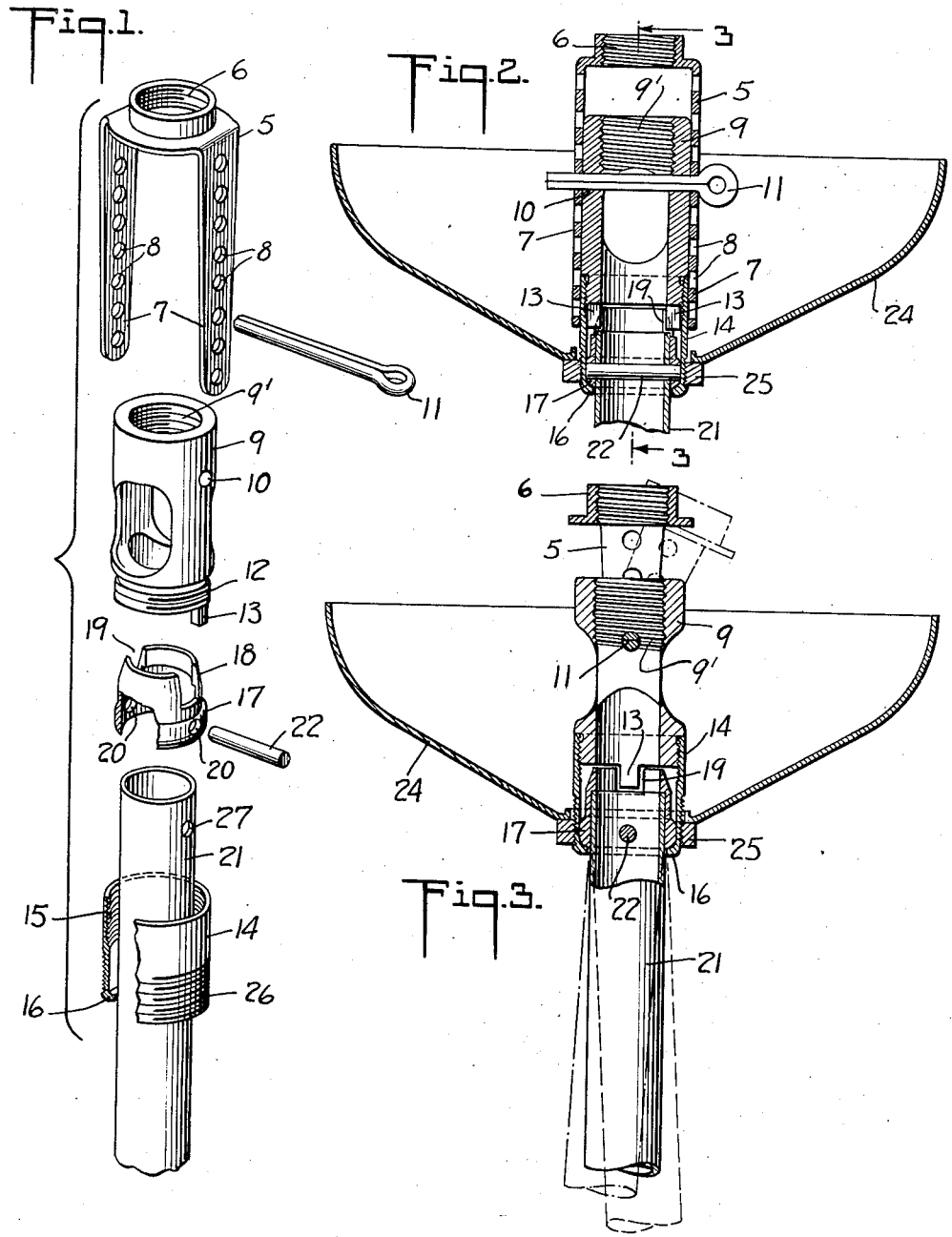
INVENTOR
Leroy C. Doane
BY
ATTORNEY Patented Feb. 14, 1939

2,147,284

UNITED STATES PATENT OFFICE 2,147,284

HICKEY

Leroy C. Doane, Meriden, Conn., assignor to The Miller Company, Meriden, Conn., a corporation of Connecticut Application May 1, 1937, Serial No. 140,137

7 Claims. (Cl. 248—343)

The present invention relates to a hickey and more particularly to a hickey permitting ready assembly of the associated parts.

The invention contemplates a hickey wherein the parts may be readily assembled or taken apart and the stem of the fixture supported thereby may be readily shortened. The invention further contemplates a flexible connection between the stem and hickey permitting a limited alinement thereof, and no turning or threading of the fixture is required.

The accompanying drawing shows, for purposes of illustrating the present invention, an embodiment in which it may take form, it being understood that the drawing is illustrative of the invention rather than limiting the same. In the drawing:

Fig. 1 is an exploded view of the hickey in their relative assembly positions;

Fig. 2 is a cross section of the hickey assembled; and

Fig. 3 is a section on 3—3 of Fig. 2.

Referring to the drawing the hickey comprises a yoke member 5 which may be a stamping and is provided with an interiorly threaded collar 6 adapted to be secured to a fixture stud in an outlet box and depending arms 7 having a plurality of alined holes 8 therein. Adapted to be supported in the yoke 5 is a tubular body member 9 which may be die cast and has a hole 10 therethrough which may be alined with the holes 8 of yoke 5 and cotter pin 11 inserted for securing the two. A tubular body member 9, which may be interiorly threaded at 9' for attachment to an outlet box stud, is provided at its lower end with an exteriorly threaded part 12 and depending lugs 13. A drawn swivel casing 14 has interiorly threaded part 15 near its upper end for mating with the threaded part 12 of member 9 to secure the casing 14 in position. The lower end of casing 14 has an inturned flange 16 for flexibly carrying a swivel ring 17, the ring having an upstanding part 18 having slots 19 therein for receiving lugs 13 of member 9.

Swivel ring 17 is provided with a pair of alined holes 20 for mounting the ring on the fixture supporting tube or stem 21, the stem also having alined holes 27 therein, there being provided a pin 22 for holding the ring in mounted position. The pin 22 is loosely mounted in ring 17 and stem 21 and is prevented from dislodgement by the wall of casing 14.

There is further provided a canopy 24 for enclosing the hickey and a lock ring 25 receivable on the screw threaded exterior part 26 of casing 14 to secure the canopy 24 in position.

The socket or other outlet carried by the stem 21 and the hickey are completely assembled as and wired as a unit. The yoke 5 may be threaded onto the outlet box stud and necessary adjustment for light be made, and the stem will hang vertically. Should it be desired to shorten stem 21 the parts may readily be taken apart and after cutting a piece off the stem and drilling new holes therethrough they may be reassembled.

It is apparent that, within the scope of the invention, modifications and different arrangements may be made other than that herein disclosed, and the present disclosure is illustrative merely, the invention comprehending all variations thereof.

What is claimed is:

1. A hickey comprising a stationary yoke, a tubular body member pivoted to the yoke to swing about a horizontal axis and provided with side openings to admit wires, a swivel case attached to said member, a swivel ring loosely carried in said case and a stem carried by said ring and movable therewith in the casing to permit alinement thereof.

2. The combination as claimed in claim 1 wherein said yoke has depending arms with a plurality of alined holes therethrough and said body member has a hole therethrough adapted to be alined with the holes in the yoke and a removable pin whereby said member may be adjustably mounted in the yoke.

3. The combination as claimed in claim 1 wherein said ring and stem are provided with alined holes, a pin loosely receivable in said holes for mounting the ring on the stem, said pin being prevented from dislodgement by the wall of the swivel casing.

4. A hickey comprising a stationary yoke, a body member supported in the yoke, said member being provided with side openings to admit wires and having depending lugs, a swivel case attached to the body member, a swivel ring flexibly carried in the casing, a stem carried by the ring and movable therewith in the casing to permit alinement thereof, said ring having an upstanding part slotted to receive said lugs and prevent rotation thereof.

5. The combination as claimed in claim 4 wherein said ring and stem are provided with alined holes, a pin loosely received in said holes for mounting the collar on the stem and prevented from dislodgement by the wall of the casing.

6. A hickey comprising a yoke, a body member having a screw-threaded part at its lower end, a pin for attaching the body member to the yoke, a swivel case, said case having an interior threaded part at its upper end adapted to engage the threaded part of the body member and having an inturned flange at its lower end, a swivel ring flexibly supported on the inturned flange of the swivel case, a stem receivable in said ring, said ring and stem having alined holes therethrough and a pin receivable in said holes for supporting the stem therein.

7. The combination as claimed in claim 1 wherein the swivel ring has an upstanding collar having slots therein and the body portion has lugs depending therefrom and receivable in the slots whereby rotation of the stem is prevented.

LEROY C. DOANE.